Aug. 4, 1970 — L. POPRADI — 3,522,699
CABLE CONSTRUCTION
Filed Dec. 2, 1968
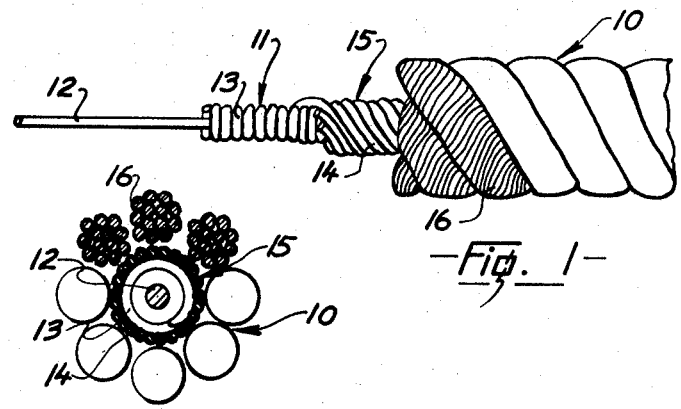
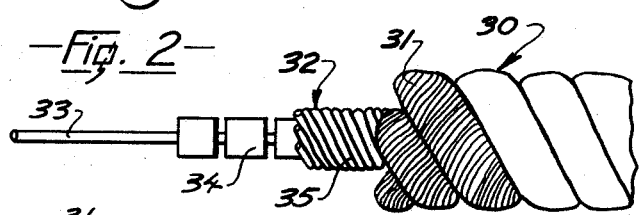
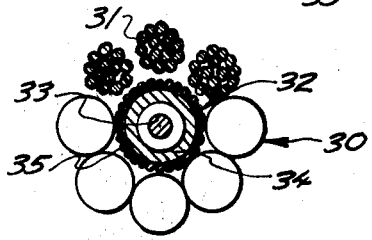
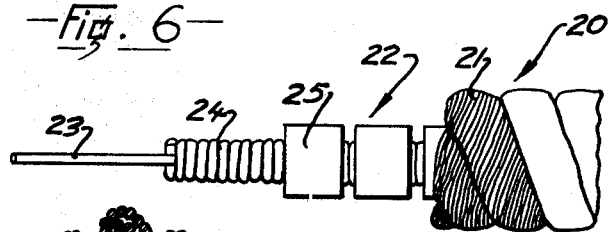
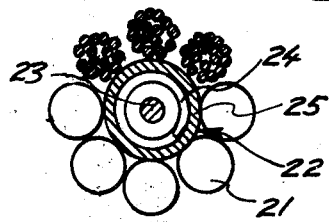
Leslie Popradi,
Inventor
by Lyle G. Trorey,
Agent

United States Patent Office 3,522,699
Patented Aug. 4, 1970

3,522,699
CABLE CONSTRUCTION
Leslie Popradi, Box 221, Port McNeil,
British Columbia, Canada
Filed Dec. 2, 1968, Ser. No. 780,352
Claims priority, application Great Britain, Dec. 27, 1967,
58,745/67
Int. Cl. D07b *1/08;* F16c *1/10, 1/26*
U.S. Cl. 57—145
5 Claims

ABSTRACT OF THE DISCLOSURE

A cable adaptable for use as a choker line having a load carrying cable formed about the hollow armored core. The core acts as a protective sheath for slidable operation of an operating line for operating, remotely, a choker hook at one end of the choker line.

BACKGROUND OF THE INVENTION

The present invention relates to cable construction and in particular but not restricted to a construction suitable for choker lines having a releasable choker hook.

As is well known in the art, a choker line is used with a choker hook, and means are required to release the hook so that the choker line may be disengaged from its load. There are many kinds of choker hooks in common use, all require to be released. Such release is ordinarily effected manually by an individual, at the hook itself. The present invention is directed generally to structure effecting release of the choker hook from a distance. I have devised releasing, or unlatching, mechanism which mechanism is not the subject of the present invention, the present invention being related to means extending from the choker hook to a distant point, and adapted to activate a releasing means from the distant point.

Logging cables, or wire ropes, from which choker lines are made are ordinarily made by laying strands in a particular manner upon a central core, usually hemp. The present invention is directed to a wire rope having strands laid on a core such as a Bowden type cable which, as is well known, can consist of a central wire adapted for axial motion within a tube which can be a closely wound helix, also generally of wire, surrounding the central wire. Multitudinous uses of Bowden cable in diverse fields are deemed to be so well known as not to require description in the present disclosure.

In attempting to include a Bowden type cable of a known kind in a wire rope difficulties arise. Choker lines are subjected to rough treatment including impactive load, are hauled along rough and rocky terrain, and often are stressed to, or even beyond, nominal breaking load. In some of these circumstances there is reduction in diameter of the rope itself tending to compress the tube e.g. the wire helix. If such compression is not sufficient to result in permanent strain, harm might not result in the present application since it is not necessarily required to activate a choker hook release mechanism other than when the choker line is unloaded, or nearly so.

Even under loading well within the rated capacity of the wire rope, it is well known that new ropes after use are found to increase in length and reduce in diameter. Consequently any Bowden wire core would, even in these circumstances, have been compressed. Thus, in order to produce an effective Bowden-wire-like control within a choker line, structure must be provided to overcome the compression difficulty which can occur even under normal loading conditions. With the particularly rough treatment to which a choker line is subjected, to provide successful reliable operation requires particular protective structure, that structure being the subject matter of the present invention.

SUMMARY OF THE INVENTION

I have discovered that this difficulty can be reduced to such extent as to provide effective Bowden-wire-like remote control, by means of utilizing structure as follows. In one embodiment of the invention the "core" itself of the choker line is a Bowden cable of a known heavy duty type having a steel wire central member slidable within the Bowden helix. A protective armor of a plurality of wires externally surrounding the Bowden helix is provided. The armor, as later described in detail is the said plurality in side-to-side relation, and twisted spirally to encompass the Bowden wire. The armored Bowden cable then forms an inner core upon which the rope is wound, in a manner otherwise similar to the manner in which such ropes are ordinarily wound. Other forms of tubular cores as hereinafter described can also be employed.

BRIEF DESCRIPTION OF THE DRAWINGS

FIG. 1 is a side elevation illustrating one form of a choker line according to the present invention.

FIG. 2 is a sectioned end view of the line of FIG. 1.

FIGS. 3 and 4 are views similar to FIGS. 1 and 2 of another form of choker line according to the invention.

FIGS. 5 and 6 are also views similar to FIGS. 1 and 2 of yet another form of choker line according to the invention.

DESCRIPTION OF PREFERRED EMBODIMENT

Referring to FIGS. 1 and 2, one embodiment of a rope configuration according to the present invention is designated generally by the numeral 10.

A Bowden cable, designated generally 11, has a central steel wire 12 which acts as an operating line slidable axially within a helical sheath 13, the elements 12 and 13 aforesaid being a common Bowden cable of a type known in the trade as heavy duty. It is to be noted that the sheath 13 is a single spring steel wire helically surrounding the central wire 12. The numeral 14 designates generally a protective armor surrounding the Bowden cable 11. It is seen that this armor has a plurality of wires 14, which may be considered as being a generally cylindrical configuration of wires in side-to-side relation, the cylindrical configuration having been twisted to assume a form as illustrated in FIG. 1. The Bowden cable 13 and the armor 14 are used as a core 15 upon which are wound stranded convolutions 16, as in an ordinary wire rope.

It is thus seen that a central concept of the present invention is a choker line characterized by a core including a central Bowden cable, and protective armor provided surrounding the Bowden cable. The armor has a plurality of individual wires in side-to-side relation to one another, with the strands being twisted to spiral formation encompassing the Bowden cable.

The rope configuration 10 of the invention is used generally as is an ordinary choker line, but differs therefrom in that at one end of the choker line there is provided a choker hook disengaging means of a suitable kind, the said means being activated by axial motion of the central wire of the Bowden cable within the choker line, obvious means being provided to move the wire from an end of the choker line remote from the choker hook. It has been found that, with the Bowden cable being armored as aforesaid, action of the Bowden cable is not adversely affected for the present purposes by reduction of outside diameter of the choker line, consequent upon ordinary use. It is also found that in woods operations in rough rocky terrain where choker lines are subjected to hard usage, such usage does not prevent the central wire of the Bowden cable being pulled axially so as to actuate a hook disengaging mechanism. For the larger sizes of wire rope in common use, or when unusually adverse conditions are expected to be encountered, obviously one or more additional thicknesses of armor, generally similar to that above described, can be provided. In case that a second thickness is provided the spiral runs in an opposite direction to that of the spiral 14, that is to say the inner and outer spirals would be oppositely twisted.

FIGS. 3 and 4 show another embodiment 20 of the choker line.

Choker line 20 is substantially the same as choker line 10. Choker line 20 is formed of wound wire convolutions 21 of the ordinary stranded wire rope encompassing a hollow flexible core 22 through which is extended an operating line or wire 23. The core 22 has an inner sheath 24 which is substantially the same as sheath 13 i.e. it is formed of a single spring steel wire helically surrounding the operating line 23. The core 22 also includes a protective armor 25 which is formed of a plurality of segments of a tubular spring steel pipe, said segments extending in spaced apart, end to end relationship. The slight spacing of the segments of the armor is designed to permit full flexure of the choker line 20.

FIGS. 5 and 6 illustrate yet another embodiment 30 of the choker line of the invention. Choker line 30 is formed in the manner substantially the same as choker lines 10 and 20 having wound convolutions 31 of the ordinary stranded wire rope embracing a hollow core 32 through which an operating line 33 extends for axial movement. The core 32 has an inner sheath 34 formed of a plurality of short segments of spring steel tubing extending in slightly spaced apart, end to end relationship, said segments being maintained in position by a protective armor formed of a plurality of wires 35 similar to wires 14. The wires 35 are wound around the sheath 34 in a spiral configuration.

It will be appreciated that the construction of the cores of each of the embodiments of choker lines is such that they will withstand, without permanent deformation, forces exerted thereupon by radial contraction of the stranded wire convolutions of their respective ropes when a load is applied to the choker lines so as to permit movement of the operating lines therein when the loads are removed from the choker lines.

What is claimed is:

1. Cable construction including:
   (a) a hollow flexible core adapted slideably to carry an operating line,
   (b) a plurality of stranded wire rope convolutions wrapped about the core so as to form a load bearing rope,
   (c) said core having an inner resilient sheath member and an outer resilient armour member encompassing the sheath member adapted to resist permanent deformation under radial stresses exerted thereon when the rope is loaded so as to permit operation of the operating line when the load is removed from the rope.

2. Structure as claimed in claim 1 in which the sheath member is a single length of helically wound spring steel wire.

3. Structure as claimed in claim 2 in which the armour member is formed of a plurality of strands of spring steel wire wrapped helically about the sheath member.

4. Structure as claimed in claim 1 in which the sheath member is formed of a plurality of axially aligned, spaced apart segments of spring steel tubing.

5. Structure as claimed in claim 2 in which the armour is formed of a plurality of axially aligned, spaced apart segments of steel tubing.

References Cited

UNITED STATES PATENTS

| 2,036,528 | 4/1936 | Kesling | 74—501 XR |
| 2,706,494 | 4/1955 | Morse | 74—501 XR |
| 2,732,861 | 1/1956 | Gilmore | 74—501 XR |
| 3,135,131 | 6/1964 | Marr | 74—501 |
| 3,135,132 | 6/1964 | Bratz | 74—501 |
| 3,146,576 | 9/1964 | Wezel | 57—145 XR |
| 3,192,795 | 7/1965 | Pierce | 74—501 |
| 3,238,808 | 5/1966 | Barnard | 74—501 |
| 3,257,863 | 6/1966 | Hanson | 74—501 |

FOREIGN PATENTS 681,522  5/1930  France.

DONALD E. WATKINS, Primary Examiner

U.S. Cl. X.R.

74—501